(12) United States Patent
Harsu

(10) Patent No.: US 6,497,364 B1
(45) Date of Patent: Dec. 24, 2002

(54) CHIP CARD CONNECTOR AND MOBILE STATION

(75) Inventor: Heikki Harsu, Mouhijärvi (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/563,387

(22) Filed: May 3, 2000

(30) Foreign Application Priority Data

May 3, 1999 (FI) .................................................. 991002

(51) Int. Cl.⁷ .............................................. G06K 19/06
(52) U.S. Cl. ...................................... 235/441; 235/492
(58) Field of Search ................................ 235/441, 486, 235/487, 492, 780, 375; 439/64, 886, 66, 887

(56) References Cited

U.S. PATENT DOCUMENTS

| | | | | |
|---|---|---|---|---|
| 3,581,019 A | | 5/1971 | Ryan ............................ | 179/41 |
| 5,231,274 A | * | 7/1993 | Reynier et al. .............. | 235/441 |
| 5,269,707 A | * | 12/1993 | Reichardt et al. ........... | 439/630 |
| 5,334,827 A | * | 8/1994 | Bleier et al. ................ | 235/492 |
| 5,527,192 A | | 6/1996 | Juret ........................... | 439/862 |
| 5,586,890 A | * | 12/1996 | Braun .......................... | 439/66 |
| 5,633,490 A | * | 5/1997 | Vandenengel ................ | 235/492 |
| 5,714,742 A | * | 2/1998 | Ieda ............................ | 235/441 |
| 5,741,986 A | * | 4/1998 | Schoenhenz ................ | 73/865.9 |
| 5,746,607 A | | 5/1998 | Bricaud et al. .............. | 439/66 |
| 5,894,597 A | * | 4/1999 | Schwartz et al. ............ | 455/558 |
| 6,050,492 A | * | 4/2000 | Hoolhorst .................... | 235/475 |
| 6,050,857 A | | 4/2000 | Lok ............................. | 439/630 |
| 6,053,775 A | * | 4/2000 | Ungermann et al. ......... | 439/630 |
| 6,036,425 A | * | 7/2000 | Lescoat ....................... | 439/630 |
| 6,165,021 A | * | 12/2000 | Bourne ........................ | 439/630 |
| 6,234,844 B1 | * | 5/2001 | Somerville et al. ......... | 439/630 |
| 6,241,557 B1 | * | 6/2001 | Reichardt .................... | 439/637 |
| 6,244,911 B1 | * | 6/2001 | Heim .......................... | 439/862 |
| 6,283,376 B1 | * | 9/2001 | Schuder etla. .............. | 235/486 |
| 6,334,786 B1 | * | 1/2002 | Lee ............................. | 439/331 |

FOREIGN PATENT DOCUMENTS

| | | |
|---|---|---|
| EP | 0982679 A1 | 3/2000 |
| WO | WO 97/32275 | 9/1997 |
| WO | WO 98/34218 | 8/1998 |

* cited by examiner

Primary Examiner—Thien M. Le
(74) Attorney, Agent, or Firm—Perman & Green, LLP (57) ABSTRACT

The invention relates to a connector for the chip card of an electronic device, such as a SIM (Subscriber Identity Module) card used to identify the user of a mobile station or the subscriber of a network service. The electrical contact between the connector and the chip card is provided by metal balls (3A) fastened to the flexible parts (4A) of the connecting springs. The ball (3A) is welded on the ball bed formed on the spring (4A) and it is supported by the edge of the opening (3B) in the frame. Due to the support provided by the ball (3A) and the edge (3B), the chip card can be slipped to the connector from several directions. Only the holder of the chip card and the construction of the electronic device set limits to the installation direction.

20 Claims, 9 Drawing Sheets

PRIOR ART

CHIP CARD CONNECTOR AND MOBILE STATION

The invention relates to a chip card connector for connecting a chip card, such as a SIM (Subscriber Identity Module) card to a mobile station, and a mobile station in which the chip card connector according to the invention is used.

A chip card is used in an electronic device, such as in a mobile station, for example for identifying the subscriber or saving information. Generally, the electronic device has a chip card holder welded on the circuit board and a connector with connecting springs for connecting to the chip card. For this purpose, the chip cards have gold-plated connecting surfaces by which an electric connection to the circuits of the chip card is established.

The prior art devices have the drawback that placing the chip card to the holder and connector is difficult, because the chip card has to be placed directly against the springs or slid on place from a certain direction.

It is the objective of the invention to provide a new chip card connector to which the chip card can be placed from as many directions as possible.

The invention relates to a chip card connector which comprises an insulating frame and at least one elongated, electrically conductive connecting spring, which incorporates a part for touching the contact area of the chip card, which part has a bent shape mainly in the longitudinal direction of the connecting spring. According to the invention, the part arranged for making the connection is bent not only longitudinally but also transversely, and the frame comprises at least one supporting part to prevent movement in the plane direction of the chip card, the transverse direction of the connecting spring.

Thus the part of the connecting string arranged for making the connection is flexible with regard to the transverse direction, essentially orthogonal to the plane of the chip card, even if the chip card is put on place from another direction than the longitudinal direction of the connecting spring.

The invention also relates to an electronic device, which comprises a processor for reading the information of the chip card, a memory for saving the programs of the processor, a chip card connector for connecting to the chip card, at least one printing unit for printing information which is presented for the operations, and an input device for using the operations. According to the invention, the chip card connector comprises an insulating frame and connecting springs, and the part of at least one connecting spring arranged for touching the contact area of the chip card is bent in at least two directions, and the frame comprises at least one supporting part to prevent movement in the plane direction of the chip card, the transverse direction of the connecting spring.

The invention also relates to a mobile station, which comprises a processor for reading the identification information of the subscriber's identification card, a memory for saving the programs of the processor, an identification card connector for connecting to the identification card of the subscriber, at least one printing unit for printing information which is presented for the operations, an input device for using the operations, a transceiver and an antenna for connecting to the radio network. According to the invention, the identification card connector comprises an insulating frame and connecting springs, and the part of at least one connecting spring, which is arranged for touching the contact area of the identification card is bent in at least two directions, and the frame comprises at least one supporting part to prevent movement in the plane direction of the chip card, the transverse direction of the connecting spring.

According to the invention, the chip card can be installed from at least four horizontal directions or from above. This gives more design freedom to the designer of the electronic device, such as a mobile station, because the installation direction of the chip card connector is not important any more. Furthermore, little room is needed on the circuit board for the connector according to the invention, because there is room for components under the connector.

The connector according to the invention is also a low-cost item in manufacture, and it can be easily installed in an electronic device. The connector can be installed automatically during the assembly of the device.

Preferred embodiments of the invention are presented in the dependent claims.

In the following, the invention will be described in more detail with reference to the accompanying drawing, in which.

Figure 1A:
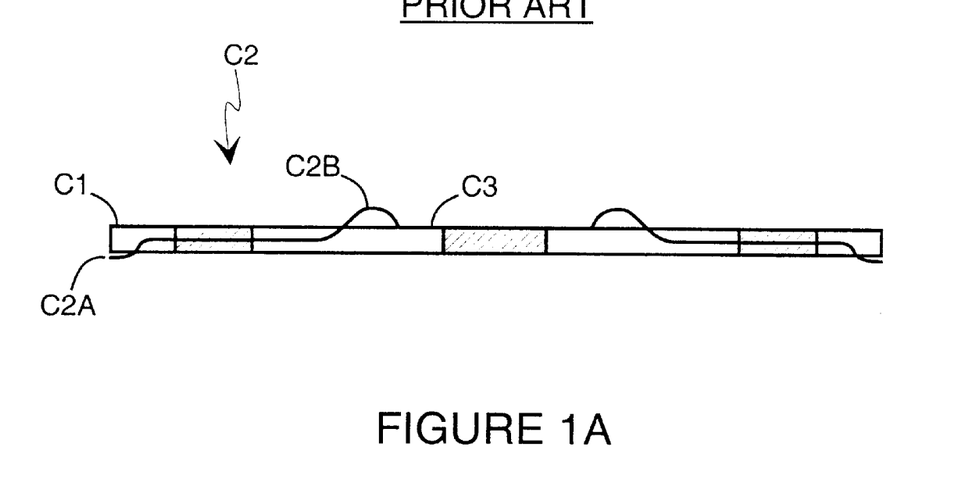
FIGS. 1A and 1B show a prior art chip card connector, which is soldered on the circuit board.
Figure 1B:
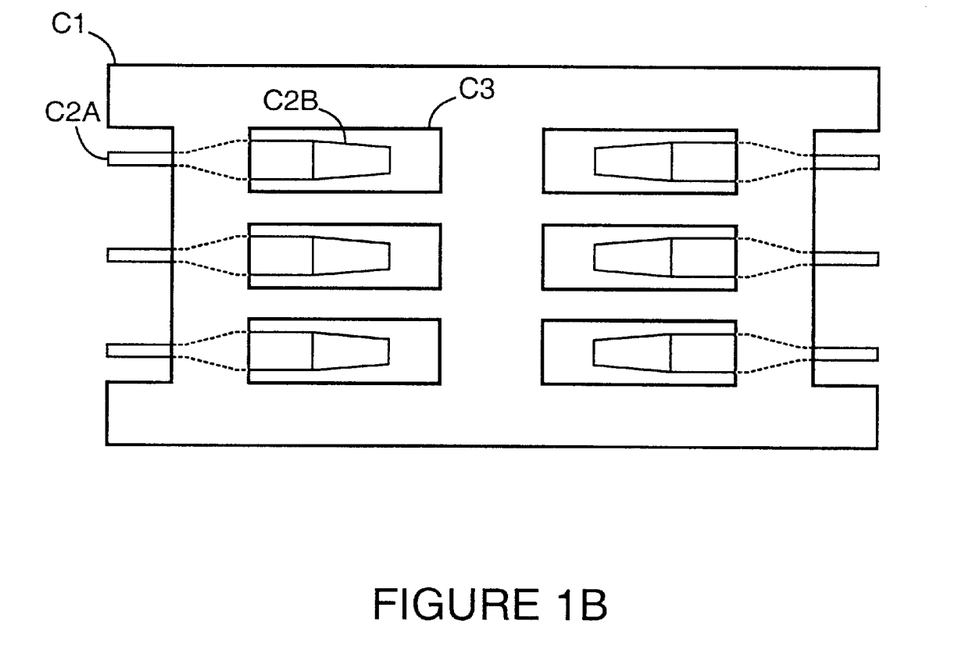

FIG. 1 shows a prior art chip card connector designed for soldering to the circuit board, which comprises a frame C1 and connecting springs C2. The narrow ends C2A of the connecting springs C2 at the outer edges of the frame are bent for soldering to the soldering areas of the circuit board. The convex, spoon-like ends C2B in the openings C3 of the frame of the connecting springs C2 are in a raised position for connecting to the chip card.

FIG. 2 shows a chip card connector according to one embodiment of the invention. FIG. 2A shows the chip card connector from the side, FIG. 2B from above, FIG. 2C from the end, and FIG. 2D as a side projection. The chip card connector according to this embodiment preferably comprises an insulating plastic frame 1, holders, such as holding juts 2, for pressing the connector to the circuit board, metal balls 3A, openings 3B shaped for the metal balls in the frame 1, and electrically conducting connecting springs, which are here divided into part 4A, which flexibly supports the metal ball 3A in the opening 3B, part 4B fastened to the frame 1, and part 4C pressing against the circuit board. The fasteners can also be shaped in other ways than presented above, such as inserts or grooves. The holders can also be replaced by soldering the connecting springs to the circuit board.

FIGS. 2E, 2F, 2G and 2H show an electrically conductive ball 3A, preferably a metal ball, an opening 3B shaped to support the metal ball flexibly from the sides, and the part 4A which flexibly supports the metal ball 3A of the connecting spring in the opening 3B as en enlargement from the top, twice from the end and as a side projection. However, the part 4A of the connecting spring is not shown entirely in FIGS. 2E, 2F and 2G.

Figure 2A:
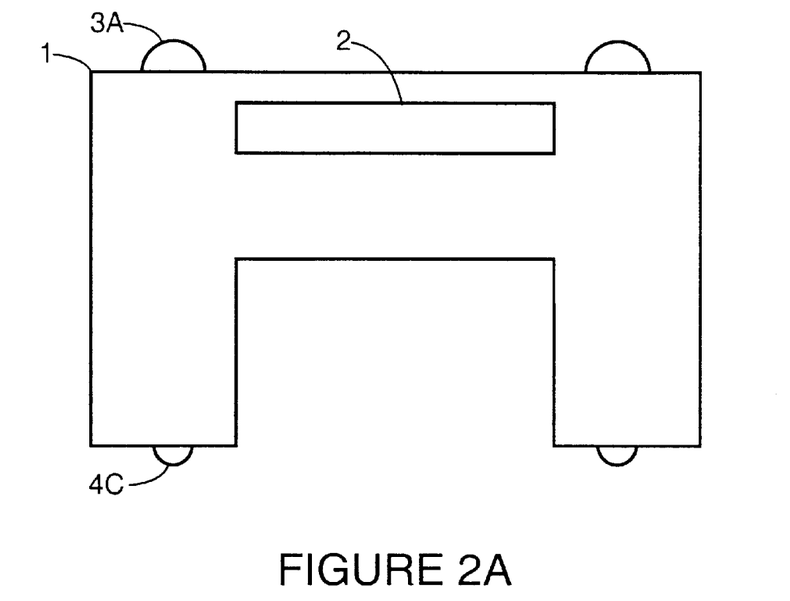
FIGS. 2A to 2H show a chip card connector according to one embodiment of the invention.
Figure 2B:
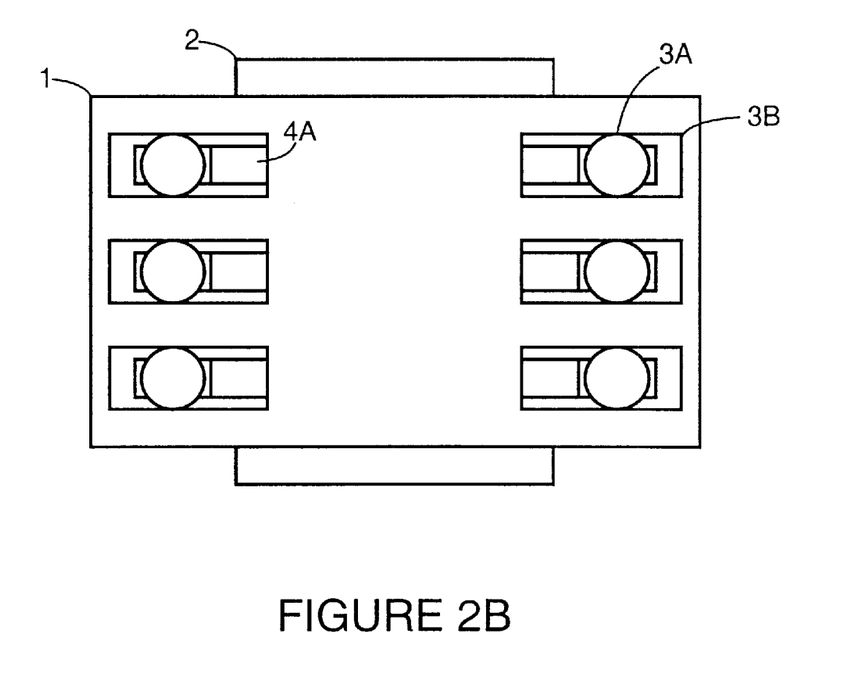
Figure 2C:
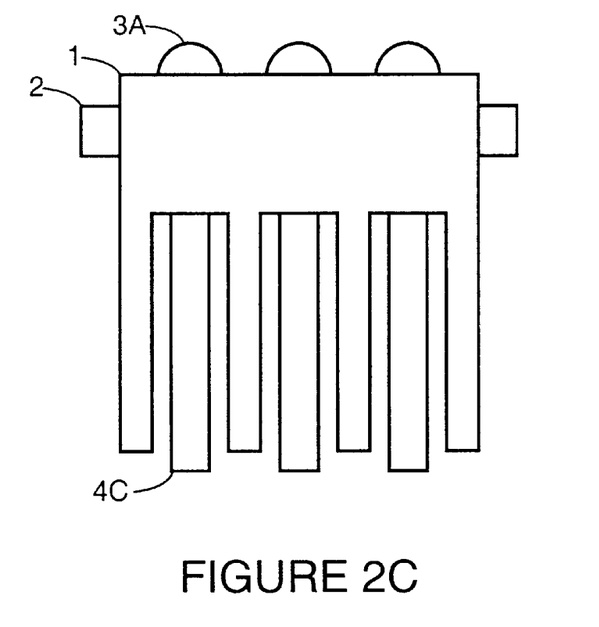
Figure 2D:
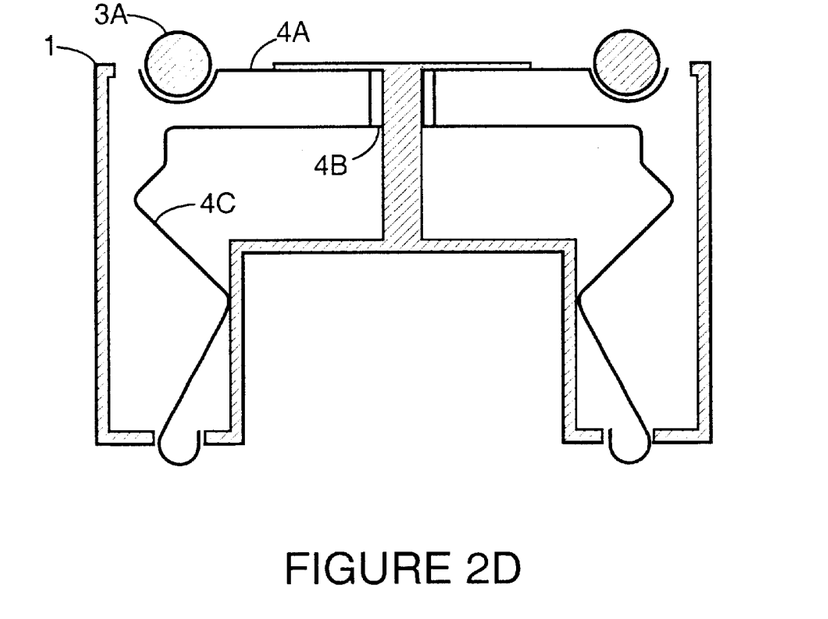
Figure 2E:
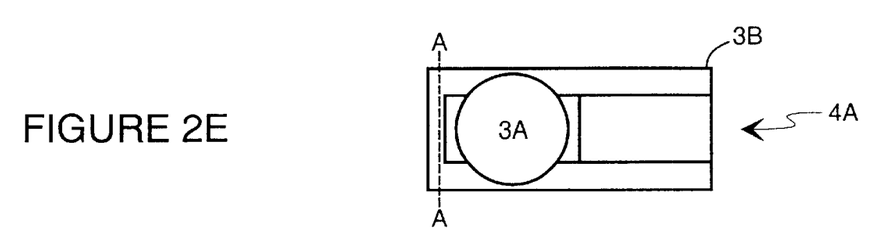
Figure 2F:
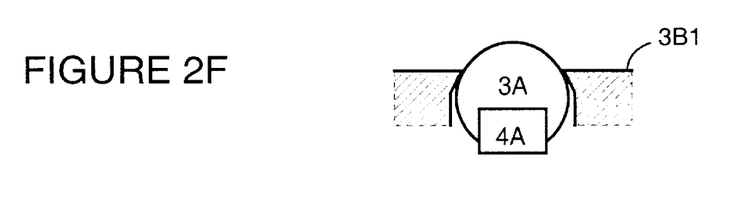
Figure 2G:
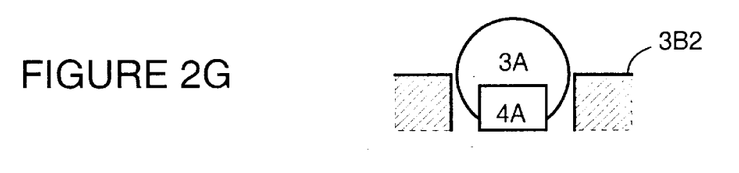

The ball 3A can be loose or fastened to the connecting spring. FIG. 2F shows how the ball 3A can be kept loose in the ball bed 4AA by means of the narrowness of the opening 3B 1 so that the ball 3A cannot slip through it. FIG. 2G shows how the ball 3A is supported only by the edges of the opening 3B1 when fastened.

Figure 2H:
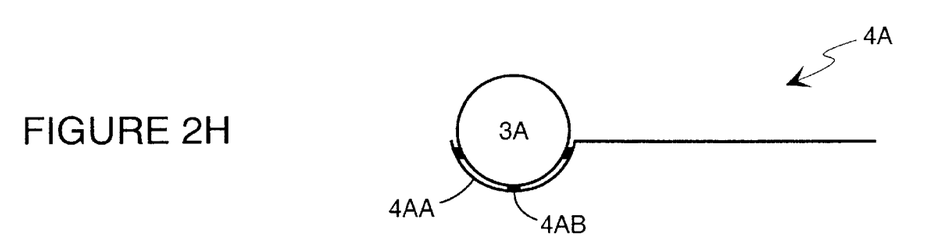

FIG. 2H shows a ball bed 4AA formed in the connection spring 4A, and a metal ball 3A, which is fastened to the ball bed by welding 4AB, for example.

FIG. 3 shows a chip card connector according to another embodiment of the invention. FIG. 3A shows the chip card connector from the side, FIG. 3B from above, FIG. 3C from the end, and FIG. 3D as a side projection. The chip card connector according to this embodiment preferably comprises a plastic frame 5, holding juts 6 for pressing the connector to the circuit board, electrically conducting connecting springs, which are here divided into a flexible, convex contact part 7A, a part 7B fastened to the frame 5, and a part 7C pressing against the circuit board, and openings 8 which are shaped for the convex contact part 7A of the connecting springs and which support the connecting springs from the sides. The holding juts 6 of this embodiment can also be shaped differently or be replaced by soldering the connecting springs to the circuit board.

Figure 3A:
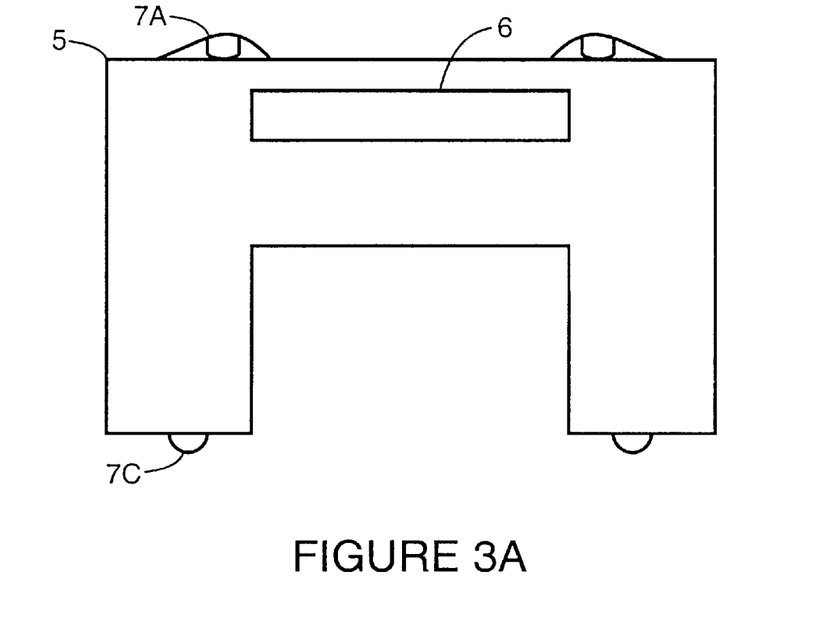
FIGS. 3A–3G show a chip card connector according to another embodiment of the invention.
Figure 3B:
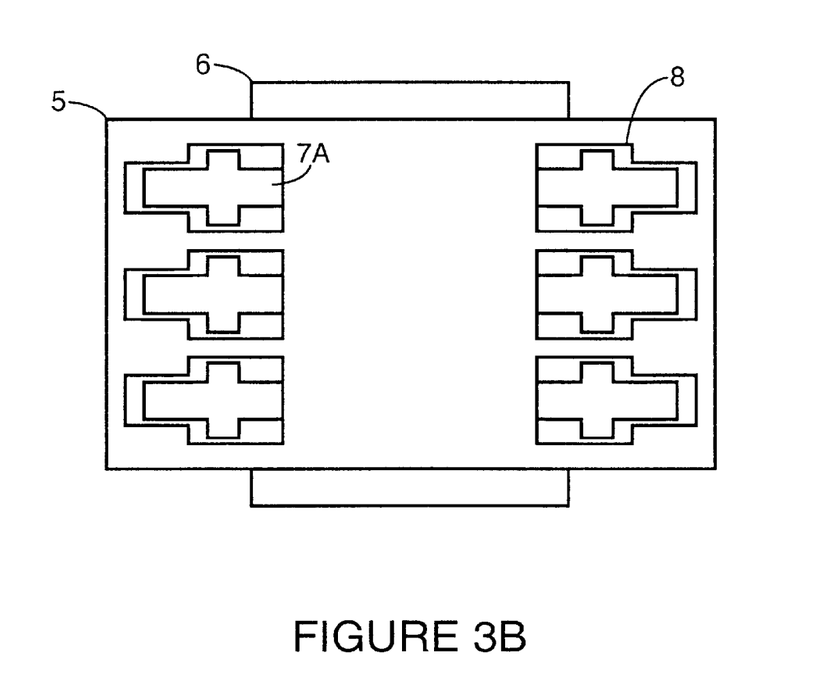
Figure 3C:
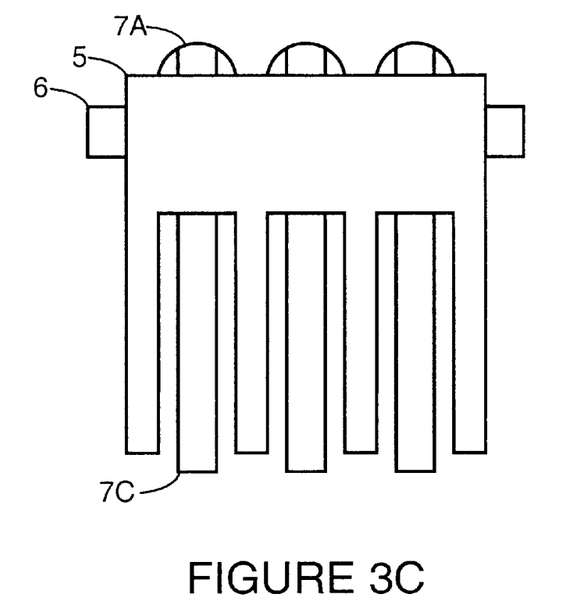
Figure 3D:
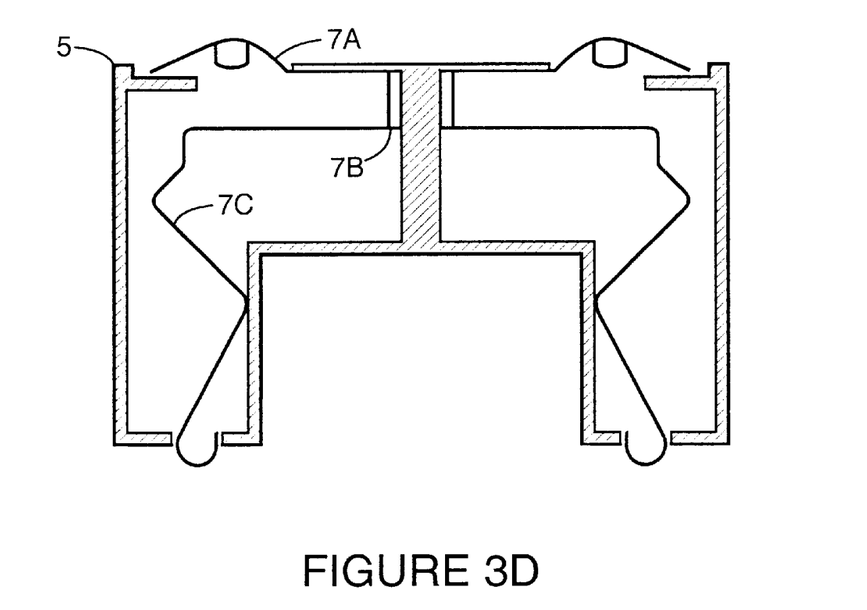
Figure 3E:
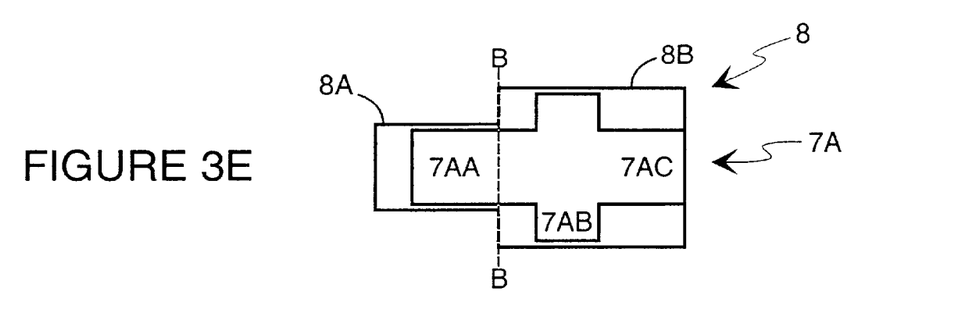
Figure 3F:
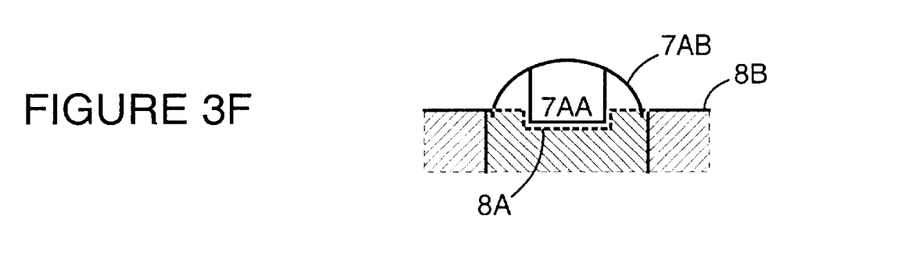
Figure 3G:
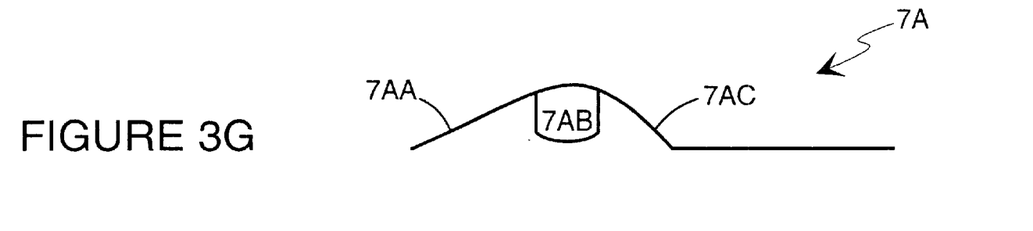

FIGS. 3E, 3F and 3G show a detailed enlargement of the convex contact part 7A of the connecting spring and the opening 8 from above, the end and as a side projection. The convex contact part 7A of the connecting spring includes a straight, downward bent, preferably plate-like end part 7AA, on the sides downward bent, convex wings 7AB and a preferably plate-like frame 7AC. The opening 8 includes a narrow part 8A, which is essentially the same width as the end part 7AA of the connecting spring and which supports the end part 7AA in the side direction, and a wide part 8B, which is essentially the width of the wing span 7AB and which supports the wings 7AB in the side direction. The wings 7AB can be rounded to enable slipping and to avoid wearing of the edges 8B by bending the ends of the wings 7AB inwards, for example.

In this connection, support from the sides or in the side direction means a direction, which is transverse in relation to the longitudinal direction of the connecting spring 4, 7.

Figure 4:
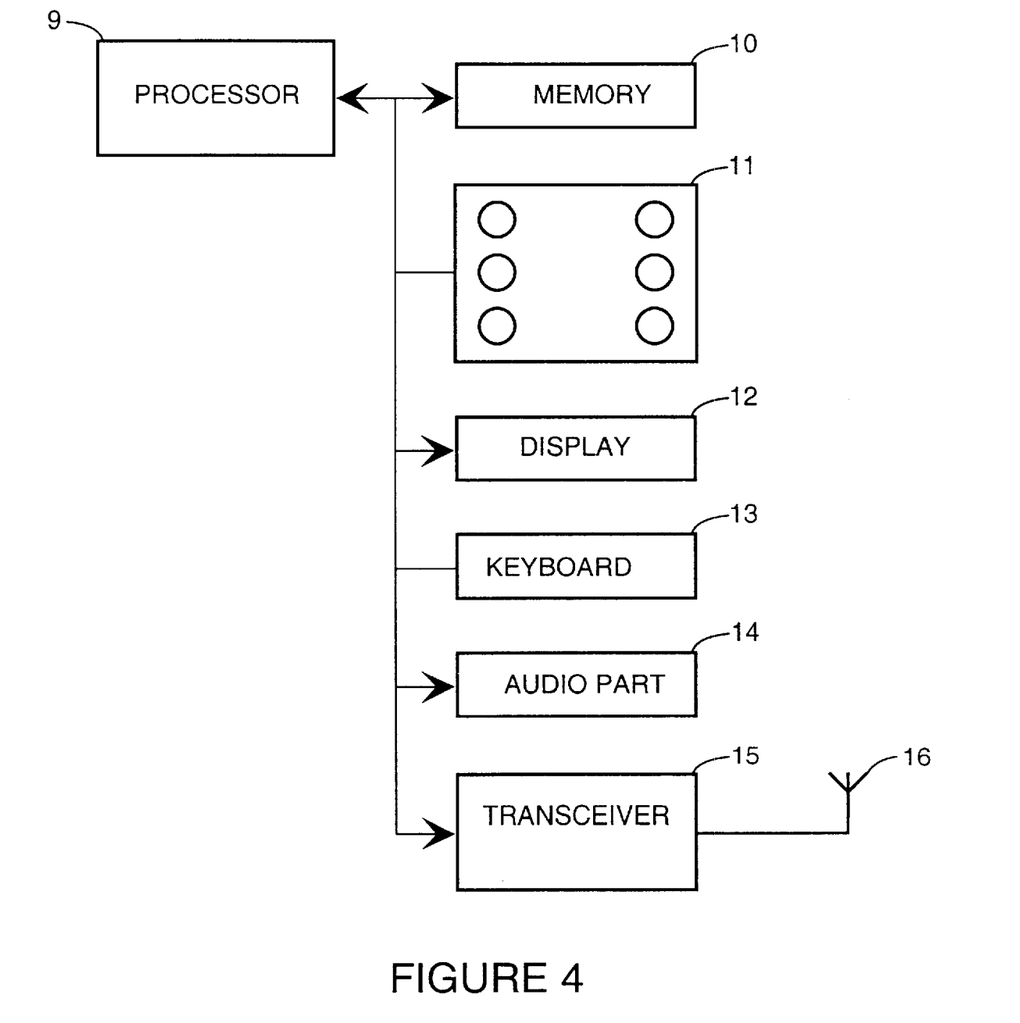
FIG. 4 shows a block diagram about a mobile station, in which a chip card connector according to one embodiment of the invention is used.

FIG. 4 presents a block diagram about a mobile station, in which a chip card connector according to the invention is used. The mobile station comprises a processor 9 for reading the identification information, a memory 10 for saving the programs of the processor 9, an identification card connector 11 according to the invention for connecting to the identification card, a display 12 for displaying information to be presented for the operations, a keyboard 13 for entering the user's password, an audio part 14 for voice transmission, a transceiver 15 and an antenna 16 for connecting to the radio network.

Figure 5:
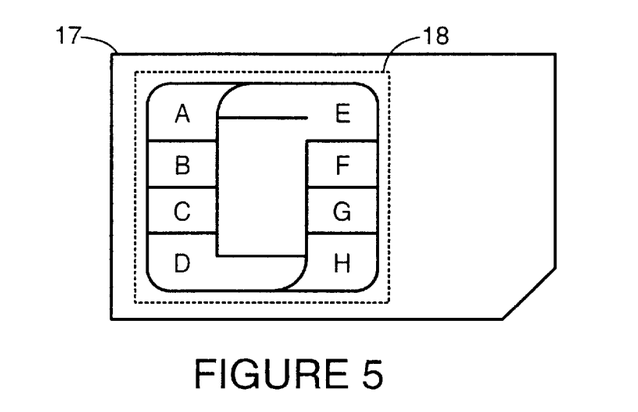
FIG. 5 shows a chip card from the side of the connection.

FIG. 5 shows a chip card 17 from the contact side. On the surface of the chip card 17 there is a contact area 18, which comprises eight subareas A, B, C, D, E, F, G, H. On the right lower edge of the chip card 17 there is also a cut corner, which ensures that the chip card 17 is always installed in the right position. For this type of card, a jut corresponding to the corner is arranged outside the connector according to the invention in order to prevent installing the card in any other position.

Figure 6:
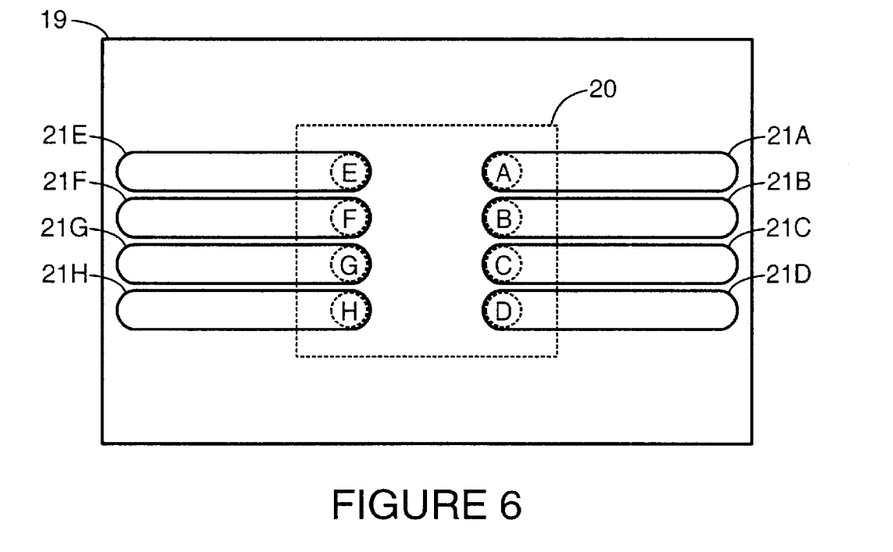
FIG. 6 shows a circuit board at the chip card connector.

FIG. 6 shows a circuit board 19 at the chip card connector. The chip card connector is pressed on the area delimited by the broken line 20 so that the lower parts of the connecting springs press on the conductive surfaces 21A–H.

Figure 7:
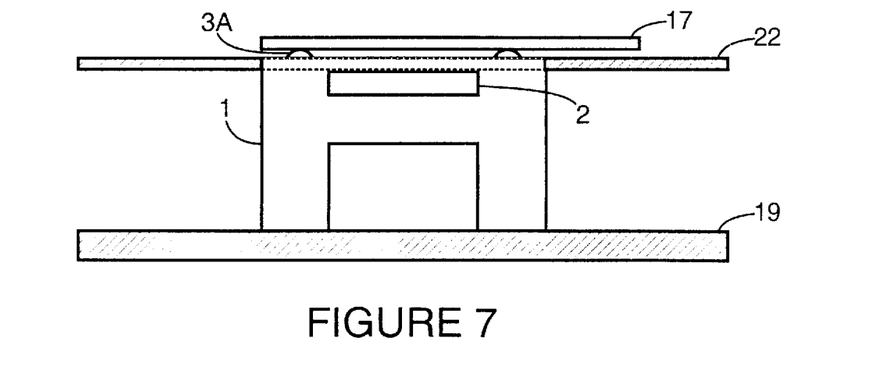
FIG. 7 shows an arrangement of a circuit board, chip card connector and an installed chip card.

FIG. 7 shows an arrangement with the frame 1 of the chip card connector, holding juts 2, the connecting spring contact parts 3A, such as balls, the chip card 17, the circuit board 19 and the inner shield 22 of the device. The chip card connector is pressed against the circuit board 19 by the inner shield 22 of the device and the holding juts 2.

The application of the connector according to the invention to different kinds of mobile stations for the reading unit, which recognizes the subscriber's identification card, is examined here by way of example. The chip card connector according to one embodiment of the invention is installed between the circuit board and the shield of the mobile station so that the edge of the opening in the shield, for example, is used to press the connector against the circuit board. Thus an electric contact is made between the contact areas of the circuit board and the connecting springs of the chip card connector. In the most common mobile stations, the subscriber's identification card is slipped to a hinged holder, by means of which the identification card is pressed against the connecting springs. Due to the connector according to the invention, the identification card can be positioned from any side, whereby the wall on the opposite side of the connecting springs makes the identification card press against the connecting springs.

The metal ball can also be replaced by a ball made from another material and coated with a conductive material. The number of connecting springs can vary according to need.

The inward bending contact part of the connecting spring can also be shaped in other ways, such as St. Andrew's cross, bent on one side or partial sphere, like a lens. However, the contact part need not have the shape of a known geometrical body, as long as the sliding property of the chip card and the stability of the holding part is ensured by a curved edge and the support of the contact part on the frame of the chip card connector.

In addition to the chip card connector, a special holder, preferably as in the prior art, is needed to hold the chip card on place. Due to the invention, however, the holder can also allow the installation of the chip card from the sides. The holder can also be implemented as an integral part of the chip card connector.

The invention is not limited to the embodiments described above by way of example, but its details can be modified without departing from the scope defined by the attached claims.

What is claimed is:

1. A chip card connector, which comprises an insulating frame and at least one elongated, electrically conductive connecting spring, which contains a part which is designed for touching the contact area of the chip card and which has a bent shape mainly in the longitudinal direction of the connecting spring, characterized in that the part designed for touching has a bent shape both in the longitudinal and transverse direction, and the frame comprises at least one supporting part to prevent movement of said part in the plane direction of the chip card, the transverse direction of the connecting spring.

2. A chip card connector according to claim 1, characterized in that the connecting spring comprises
   a flexible, convex contact part with a downward bent, plate-like end part, on the sides downward bent, convex wings and a plate-like frame,
   a part fastened to the frame, and
   a part pressing against the circuit board.

3. The chip card connector of claim 1, wherein the bent shape of the part designed for touching is round in at least two directions perpendicular to each other.

4. The chip card connector of claim 1, wherein the part designed for touching comprises a flexible convex contact part further comprising:
   in the longitudinal direction, a pair of straight, downwardly bent end parts; and in the transverse direction, a pair of straight, downwardly bent wing parts.

5. The chip card connector of claim 4, wherein an outwardly end portion of each convex wing is inwardly bent.

6. The chip card connector of claim 4, wherein the flexible convex contact part forms a cross-like shape.

7. The chip card of claim 1, wherein the bent shape of the part designed for touching allows the contact area of the chip card to approach the part designed for touching from any transverse direction without damage to the card.

8. The chip card of claim 1, wherein a top portion of the part designed for touching is rounded along a circumference of a diameter of the top portion.

9. A chip card connector, which comprises an insulating frame and at least one elongated, electrically conductive connecting spring, which contains a part which is designed for touching the contact area of the chip card and which has a bent shape mainly in the longitudinal direction of the connecting spring, wherein the part designed for touching has a bent shape both in the longitudinal and transverse direction, and the frame comprises at least one supporting part to prevent movement of the part in the plane direction of the chip card, the transverse direction of the connecting spring, wherein the connecting spring comprises:
- a flexible part with a ball bed and a ball, which has at least an electrically conductive surface, for touching the contact area of the chip card,
- a part fastened to the frame, and
- a part to be pressed against the circuit board for making an electric contact on a contact area of said circuit board.

10. A chip card connector according to claim 3 characterized in that the frame of the chip card connector is equipped with shaped holders for pressing a connector to a circuit board in order to provide the electric contact to the connecting springs.

11. A chip card connector according to claim 9, characterized in that the frame comprises an opening, which supports the electrically conductive ball from the sides in relation to the longitudinal direction of the connecting spring.

12. A chip card connector according to claim 9, characterized in that at least the surface of the ball is made of metal and placed as floating on the ball bed of the connecting spring so that the opening of the frame, which supports the ball is at least in one direction smaller than the diameter of the ball.

13. A chip card connector according to claim 9, characterized in that the ball is made of metal and fastened to the ball bed of the connecting spring by welding.

14. A chip card connector, which comprises an insulating frame and at least one elongated, electrically conductive connecting spring, which contains a part which is designed for touching the contact area of the chip card and which has a bent shape mainly in the longitudinal direction of the connecting spring, wherein the part designed for touching has a bent shape both in the longitudinal and transverse direction, and the frame comprises at least one supporting part to prevent movement of the part in the plane direction of the chip card, the transverse direction of the connecting spring, wherein the connecting spring comprises:
- a flexible, convex contact part with a downward bent, platelike end part, on the sides downward bent, convex wings and
- a plate-like frame,
- a part fastened to the frame,
- a part pressing against the circuit board; and wherein the frame comprises an opening which is shaped for the flexible, convex contact part of the connecting spring and which comprises a narrow part essentially of the width of the end part, which supports said end part of the connecting spring from the sides, and a wide part essentially of the width of the span of the wings, which supports said wings of said connecting spring from said sides.

15. An electronic device, which comprises a processor for reading information of a chip card, a memory for saving programs of the processor, a chip card connector for connecting to the chip card, at least one printing unit for printing information to be presented for operations, and an input device for using the operations, characterized in that the chip card connector comprises an insulating frame and connecting springs and that a part of at least one connecting spring provided for touching on a contact area of the chip card is bent in at least two directions, and said frame comprises at least one supporting part to prevent movement in the plane direction of said chip card, the transverse direction of said connecting spring.

16. The electronic device of claim 15, wherein the part of the connecting spring for touching the contact area of the chip card forms a rounded surface along a circumference of a top portion of the part.

17. A mobile station, which comprises a processor for reading identification information of an identification card of a subscriber, a memory for saving programs of the processor, an identification card connector for connecting to the identification card of the subscriber, at least one printing unit for printing information to be presented for operations, an input device for using the operations, a transceiver and an antenna for connecting to a radio network, characterized in that the identification card connector comprises an insulating frame and connecting springs and that a part of at least one connecting spring provided for touching on a contact area of the chip card is bent in at least two directions, and said frame comprises at least one supporting part to prevent movement in the plane direction of said chip card, the transverse direction of said connecting spring.

18. A mobile station, which comprises a processor for reading identification information of an identification card of a subscriber, a memory for saving programs of the processor, an identification card connector for connecting to the identification card of the subscriber, at least one printing unit for printing information to be presented for operations, an input device for using the operations, a transceiver and an antenna for connecting to a radio network, characterized in that the identification card connector comprises an insulating frame and connecting springs and that a part of at least one connecting spring provided for touching on a contact area of the chip card is bent in at least two directions, and the frame comprises at least one supporting part to prevent movement in the plane direction of the chip card, the transverse direction of the connecting spring, wherein the connecting spring of the identification card connector contains:
- a flexible part with a ball bed and a ball, which has at least an electrically conductive surface, for touching the contact area of the chip card,
- a part fastened to the frame, and
- a part to be pressed against a circuit board for conducting electricity.

19. A mobile station according to claim 18, characterized in that the frame of the identification card connector is equipped with shaped holders for pressing said connector by means of an inner shell of the mobile station to a circuit board in order to provide an electric contact to the connecting springs.

20. A mobile station, which comprises a processor for reading identification information of an identification card of a subscriber, a memory for saving programs of the processor, an identification card connector for connecting to the identification card of the subscriber, at least one printing unit for printing information to be presented for operations, an input device for using the operations, a transceiver and an antenna for connecting to a radio network, characterized in that the identification card connector comprises an insulating frame and connecting springs and that a part of at least one connecting spring provided for touching on a contact area of the chip card is bent in at least two directions, and the frame comprises at least one supporting part to prevent movement in the plane direction of the chip card, the transverse direction of the connecting spring, wherein the frame contains an opening, the edges of which support the electrically conductive ball from the sides in relation to the longitudinal direction of the connecting spring.

\* \* \* \* \*

UNITED STATES PATENT AND TRADEMARK OFFICE
CERTIFICATE OF CORRECTION

PATENT NO. : 6,497,364 B1 Page 1 of 1
DATED : December 24, 2002
INVENTOR(S) : Harsu It is certified that error appears in the above-identified patent and that said Letters Patent is hereby corrected as shown below:

Column 5,
Line 32, "3" should read -- 9 --.

Signed and Sealed this

Twenty-ninth Day of July, 2003

JAMES E. ROGAN
*Director of the United States Patent and Trademark Office*